United States Patent [19]

Takahashi et al.

[11] 4,310,210

[45] Jan. 12, 1982

[54] PLUG-IN TYPE CONNECTOR

[75] Inventors: Masaru Takahashi; Kiyoshi Sato, both of Nagoya, Japan

[73] Assignee: Mitsubishi Denki Kabushiki Kaisha, Tokyo, Japan

[21] Appl. No.: 70,634

[22] Filed: Aug. 28, 1979

Related U.S. Application Data

[63] Continuation of Ser. No. 845,936, Oct. 27, 1977, abandoned.

[30] Foreign Application Priority Data

Oct. 28, 1976 [JP] Japan .................. 51/145176

[51] Int. Cl.³ .................. H01R 13/115; H01R 13/436
[52] U.S. Cl. .................. 339/64 M; 339/207 R; 339/258 F
[58] Field of Search .................. 339/64 R, 64 M, 192 R, 339/193 R, 191 R, 191 A, 191 M, 258 R, 258 F, 258 P, 176 M, 176 MP, 217 R, 210 R, 210 M, 207

[56] References Cited

U.S. PATENT DOCUMENTS

| | | | |
|---|---|---|---|
| 2,105,884 | 1/1938 | Hanser et al. | 339/191 A |
| 2,317,710 | 4/1943 | Anderson | 339/64 M |
| 2,436,914 | 3/1948 | Breisch | 339/195 M |
| 2,944,240 | 7/1960 | Barber | 339/64 M |
| 3,588,785 | 6/1971 | Hardardt | 339/64 M |
| 4,077,687 | 3/1978 | Farag | 339/64 M |

FOREIGN PATENT DOCUMENTS

| | | |
|---|---|---|
| 51-2308 | 1/1976 | Japan . |
| 53-23356 | 6/1978 | Japan . |
| 53-38864 | 9/1978 | Japan . |

Primary Examiner—Neil Abrams
Attorney, Agent, or Firm—Oblon, Fisher, Spivak, McClelland & Maier

[57] ABSTRACT

A plug-in type connector for connecting a bus bar to an electric equipment in various switch boards used in a control center etc. comprises an insulation case having a hollow chamber for containing a contact element; and a U-shape contact element which is connected to said insulation case to dispose contacting parts at an opening of the hollow chamber and to dispose a lead wire to the opposite end and which is kept in a floating condition. The lead wire is connected to the electric equipment in the switch board and the contacting part is electrically connected to the bus bar.

9 Claims, 15 Drawing Figures

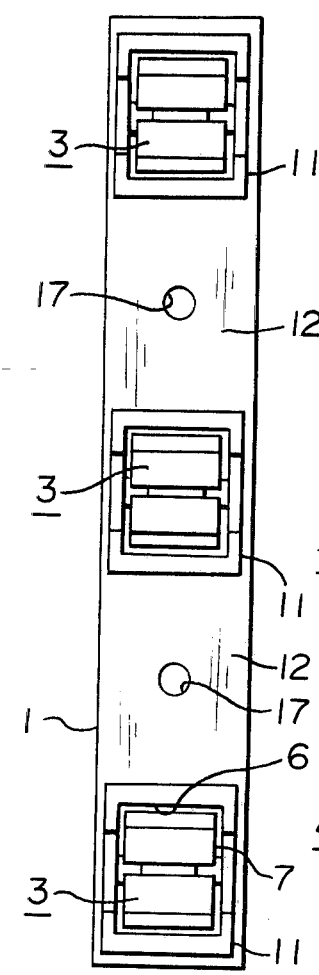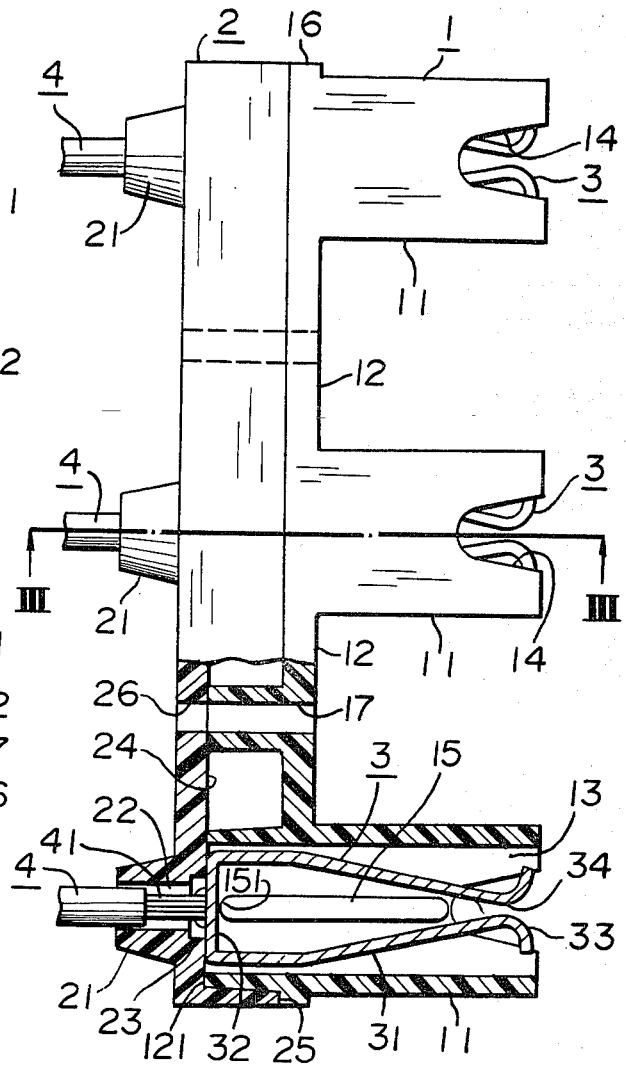

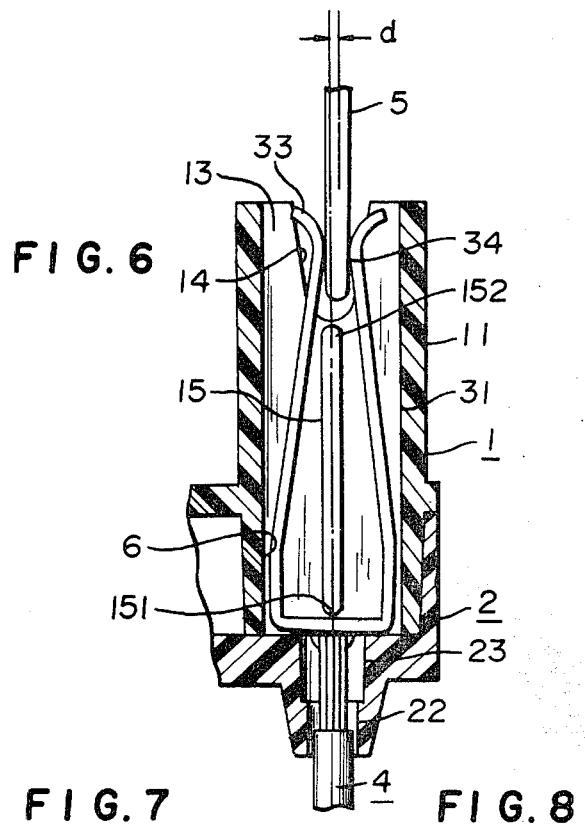
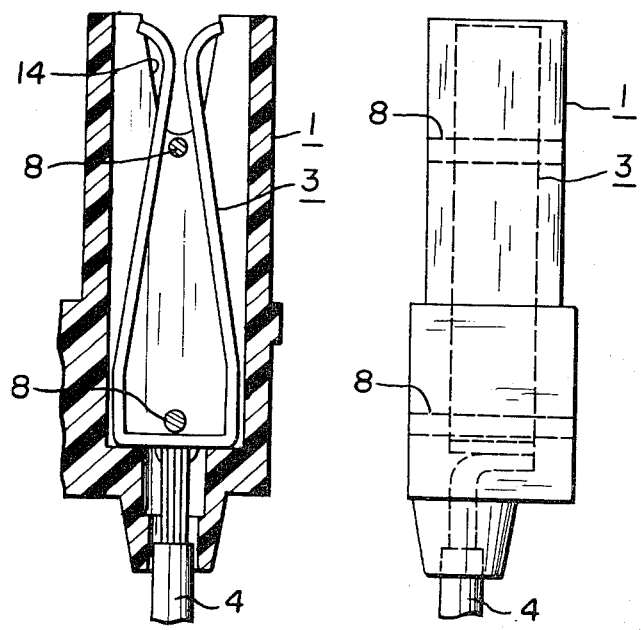

PLUG-IN TYPE CONNECTOR

This is a continuation of application Ser. No. 845,936 filed Oct. 27, 1977, now abandoned. cl BACKGROUND OF THE INVENTION 1. Field of the Invention The present invention relates to a plug-in type connector used for electrical connection in various switch boards in a control center etc. More particularly, it relates to an improved plug-in type connector which is especially effective for using it when the relative position of a contact element of the connector to a contacting part such as a bus bar do not always coincide.

2. Description of the Prior Art

It is preferable to thoroughly contact contact elements with a plug-in type connector used for feeding power from bus bars to a control unit in a control center in order to increase current capacity and to prevent fusion of the bus bar caused by passing a large short-circuit current.

However, the relative positions of the bus bars and the control unit are sometimes varied because of error in the manufacture thereof etc.

In the conventional plug-in type connector fitted to the control unit, the contact element is fitted to the insulation case so as to prevent a relative movement whereby it has been difficult to attain suitable contacting condition. Moreover, the bus bar is vibrated by electromagnetic force in the short-circuit failure to cause an instantaneous contacting failure and a fusion.

SUMMARY OF THE INVENTION

It is an object of the present ivention to provide an improved plug-in type connector wherein a contact element is completely contacted to a contacting part such as a bus bar even though relative positions of the contact element to the contacting part do not always coincide.

It is another object of the present invention to provide an improved plug-in type connector which maintains suitable contacting condition even though a bus bar is vibrated by a short-circuit failure.

The foregoing and other objects of the present invention have been attained by providing a plug-in type connector which comprises an insulation case having a hollow chamber for containing a contact element and a U-shaped contact element which is connected to the insulation case and which is kept in a floating condition so as to follow a movement of the insulation case.

BRIEF DESCRIPTION OF THE DRAWINGS

FIGS. 1 to 6 show one embodiment of a plug-in type connector according to the present invention;

FIG. 1 is a front view of the connector;

FIG. 2 is a partially broken plan view;

FIG. 3 is a sectional view taken along the III—III line;

FIG. 4 is a schematic view eliminating certain parts;

FIG. 5 is a plan view having a partially sectional view of the connector before connecting a bus bar;

FIG. 6 is a plan view having a partially sectional view of the connector showing the connection of the bus bar;

FIG. 7 is a plan view having a partially sectional view of the other embodiment according to the present invention;

FIG. 8 is a side view thereof;

FIG. 12 is a plan view having a partially broken part;

FIG. 13 is a side view thereof;

FIG. 14 is a sectional view taken along the line XIV—XIV from the arrow line; and FIG. 15 is a front view taken along the line XV—XV from the arrow line.

DETAILED DESCRIPTION OF THE PREFERRED EMBODIMENTS

Figure 4:
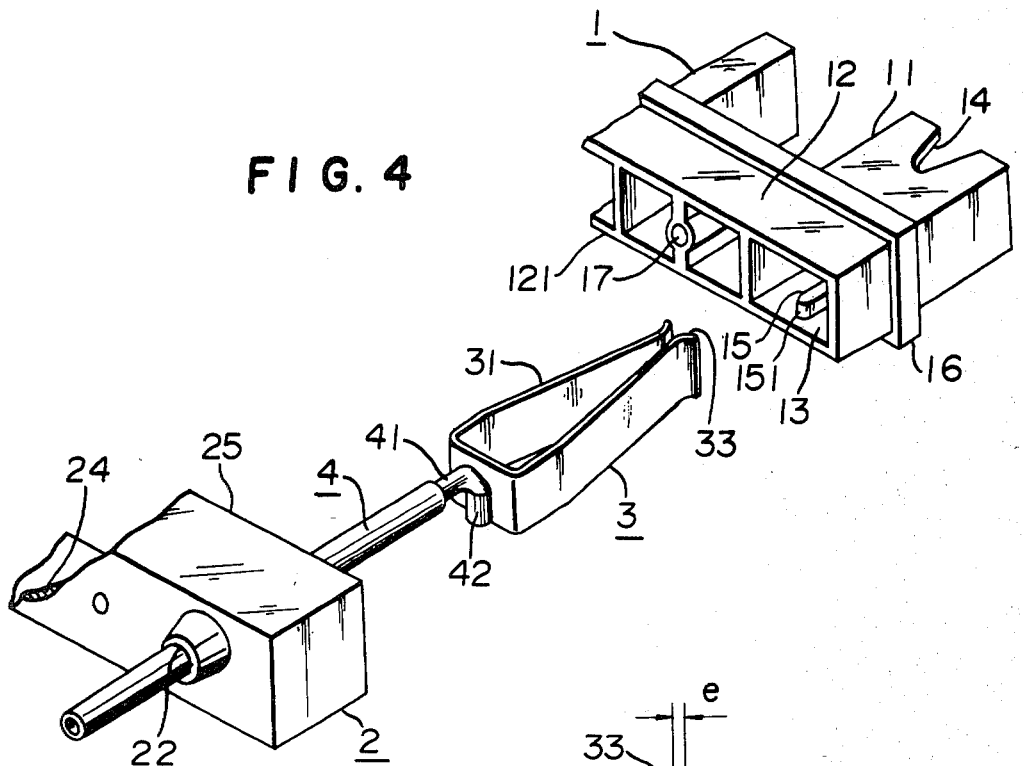

The present invention relates to a plug-in type connector used for feeding power from bus bars to a control unit in a control center etc.

It is preferable for the plug-in type connectors used for these purposes, to thoroughly and closely contact the bus bars with the contact elements (plug) so as to increase the current capacity and to prevent the fusion to the bus bar caused by passing a large short-circuit current.

However, the relative positions of the bus bars to the control units have been sometimes varied because of error in the manufactures thereof, whereby it has been difficult to maintain suitable condition for the contact in the conventional plug-in type connector. Moreover, the bus bar has been vibrated by the electromagnetic force in the short-circuit failure to cause an instantaneous contact failure or the fusion, disadvantageously.

The present invention is to prevent the trouble of the conventional connectors by holding the U-shape plug in the insulation case under a floating condition.

Referring to the drawings, certain embodiments of the present invention will be illustrated.

In FIGS. 1 to 6, the reference numeral (1) designates a first insulation case formed by molding three prismatic parts (11) and a connecting base (12) in one piece; (2) designates a second insulation case fitted on the first insulation case (1); (3) designates a resilient U-shape contact element which is held in the first insulation case (1); (4) designates a lead wire connected to the U-shape contact element and the lead wire (4) is formed by thin flexible core wires (41). In the prismatic part (11), rectangular hollow chamber (13) is formed and the V-shape concaves (14) are formed at the ends of the prismatic parts so as to expose the ends (33) of the contact elements. The reference (15) designates linear projects formed in the chamber (13) in the vertical direction and each space being substantially equal to the thickness of the contact element (3), is formed between the edge (151) and the end surface (121) of the first insulation case (1). The reference numeral (16) designates a flange formed at the bottom of the connecting part (12) and (17) designates a hole for fitting on a mount.

The second insulation case (2) is formed in a long and narrow cover and is fitted on the first insulation case (1) while contacting respectively the inner bottom (24) and the upper surface (25) to the upper end (121) of the first insulation case (1) and the flange (16). A project (21) is formed at the opposite side to the inner bottom (24) and each hollow (22) is formed in the projects (21) and each concave (23) is formed by connecting to the hollow (22) at the inner bottom side (24). The reference numeral

(26) designates a hole for fitting which is concentric with the hole for fitting (17) of the first insulation case (1).

The resilient U-shape contact element (3) consists of a pair of legs (31) wich are projected in parallel from the base bottom (32) and inwardly slant from the middle part and the edge (33) which are outwardly curved at the ends of the legs (31). Each lead wire (4) is soldered at the outer surface of the bottom (32) of the contact element (3). The soldered part (42) is soldered at the opposite side to the project (21) with the deviation.

In the assembly of the plug-in type connector of the present invention, as shown in FIG. 4, the contact element (3) is inserted into the hollow chamber (13) from the upper end side (12) of the first insulation case (1) and then, the second insulation case (2) passing the lead wire (4) through the hollow (22) is fitted on the first insulation case (1). The base (32) of the contact element (3) is held between the linear project (15) and the inner bottom (24) whereby the contact element (3) is fitted to the first insulation case (1) which is mounted through the holes (17), (26) on a mount (not shown) by a screw element.

The contact element (3) disposed in the first and second insulation cases (1), (2) is connected to the inner wall of the hollow chamber (13) with transversal spaces (6) and vertical spaces (7) under a floating condition whereby the contact element (3) can be inclined and turned in the specific ranges. The core wires (41) of the lead wire are thin and disposed in the hollow (22) and the concave (23) with spaces whereby the lead wire can be flexibly deformed depending upon the movement of the contact element (3).

Figure 5:
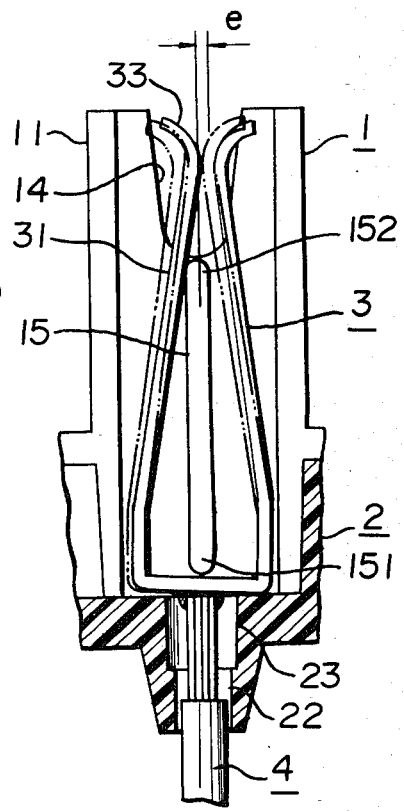

Referring to FIGS. 5 and 6, the embodiment will be further illustrated.

As shown in FIG. 5, the transversal incline of the U-shape contact element (3) connected under the floating condition is limited to the maximum range by contacting the edge (152) of the linear project (15) with the inner surface of the leg (31). In said condition, the curved surfaces of the edges (33) of the contact element are opened in the V-shape concave (14) of the insulation case and the bus bar can be inserted between the curved surfaces.

When the position of the bus bar is shifted from the V-shape concave part (14) of the plug-in type connector, the top of the prismatic part (11) is contacted with the bus bar whereby the bus bar is not fitted to the connector thus preventing the fitting of the control unit.

As shown in FIG. 6, when the position of the bus bar (5) is shifted for the distance d from the center of the plug-in type connector in the fitting, the space between legs (31) of the U-shape contact element (3) is expanded for the thickness of the bus bar to depart from the edge (152) of the linear project (15). Accordingly, even though the bus bar (5) is transversely shifted by a short-circuit accident etc. in said condition, the edge (152) therefore has no difficulty following the shift of the bus bar, whereby the disconnection of the contact element (34) from the bus bar can be prevented.

The edge (151) of the linear project (15) is formed in a spherical shape whereby the contact element (3) can be smoothly inclined.

As shown in FIGS. 7 and 8, the first and second insulation cases (1), (2) can be one piece. The same effect can be attained by inserting the contact element (3) and then connecting the contact element (3) with a pin (8).

Figure 9:
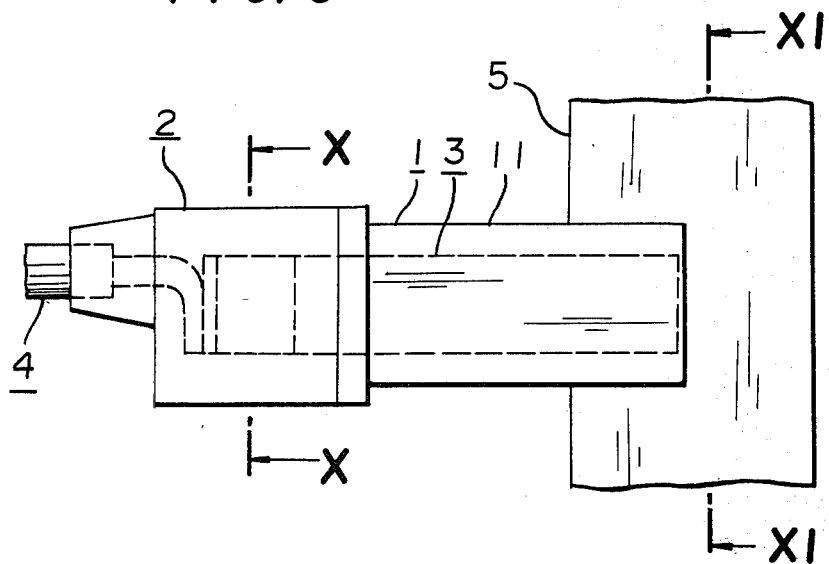
FIG. 9 is a side view showing the connection of the bus bar.
Figure 10:
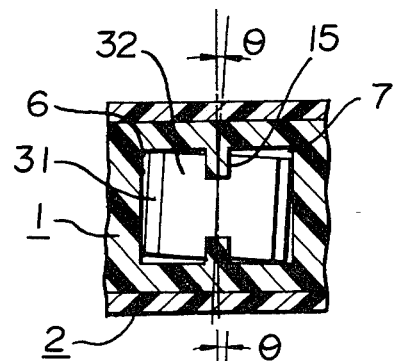
FIG. 10 is a sectional view taken along the X—X line of FIG. 9.
Figure 11:
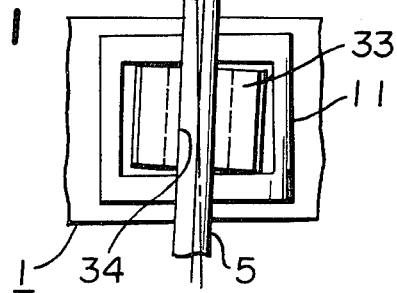
FIG. 11 is a sectional view taken along the XI—XI line of FIG. 9.
Figure 12:
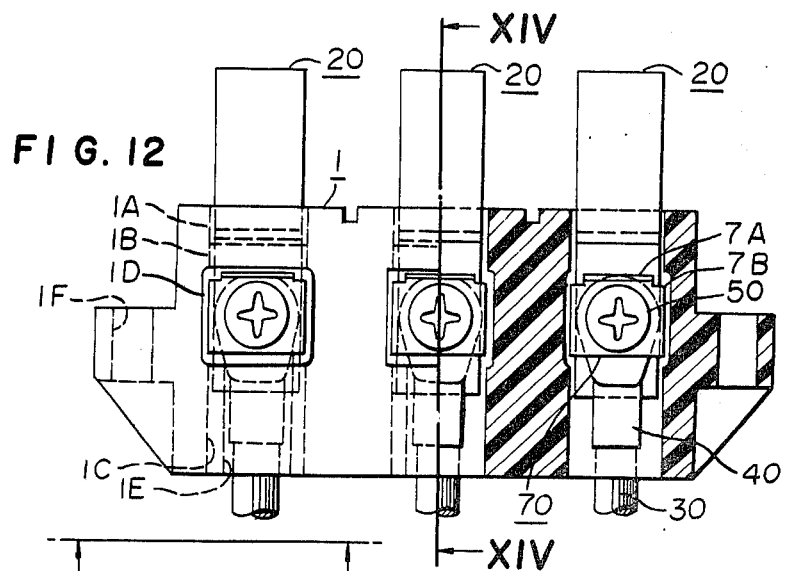
FIGS. 12 to 15 show the other embodiment of a plug-in type connector according to the present invention.
Figure 13:
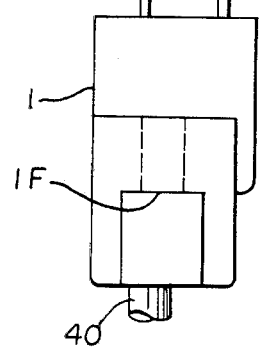
Figure 14:
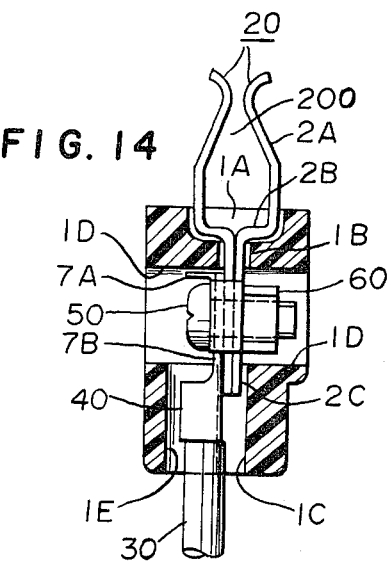
Figure 15:
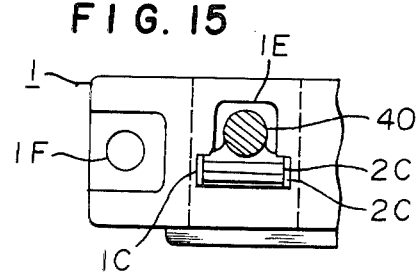

As shown in FIGS. 9, 10 and 11, even though the relative position of the bus bar (5) is shifted to incline for an angle $\theta$ from the plug-in type connector, the contact element (3) is turned so as to maintain suitable contacting condition between the bus bar (5) and the contacting part (34) in full parts.

Referring to FIGS. 12 to 15, the other embodiment of the present invention will be illustrated. In FIGS. 12 to 15, the reference numeral (1) designates the insulation case disposing three sets of the contact elements; (20) designates a pair of resilient contact elements; (30) designates a lead wire on which a compressed terminal (40) is disposed; (50) designates a connecting element of a screw which clamps the pair of the contact elements (20) and the compressed terminal (40) with a nut (60); (70) designates a washer disposed on the compressed terminal (40).

The pair of contact element (20) comprise contact legs (2A) for forming U-shape contacting part (200) to face each other; a flat legs (2C) which are backwardly extended and step parts (2B) connecting the legs. The insulation case (1) has the first communicating hollow comprising a concave part (1A) for receiving the contact legs (2A); square hollows (1B), (1C) for receiving the flat legs (2C); a lead wire receiving hollow (1E) connecting to the square hollow (1C). The insulation case (1) has the second communicating hollow (1D) formed in perpendicular to the first communicating hollow. The second communicating hollow (1D) is formed so as to expose the central part of the flat legs (2C) and to contain the lead wire connecting part comprising the connecting element (50) and the nut (60).

In the assemblies of the plug-in type connector, the lead wire (30) on which the compressed terminal (40) is nipped, is inserted through the first communicating hollow (1C), (1E) to the position of the second communicating hollow (1D). The pair of contact elements (20) are inserted from the opposite side (1A), (1B) of the first communicating hollow to the lower part of the compressed terminal (40). The connecting element (50) and the nut (60) with the washer (70) are screwed from both sides of the second communicating hollow (1D) to fasten them whereby the flat legs (2C) and the compressed terminal (40) are fixed. The bent legs (7B) of the washer (70) are effective for adjusting the position in the fastening operation. The upper bent leg (7A) and the edge of the compressed terminal (40) prevents the falling of the contact element from the insulation case (1). The step part (2B) of the contact element (20) is contacted with the inner wall behind the concave part (1A) so as to prevent the falling of the contact element assemble to the side of the square hollow (1C).

The spaces are formed between the contact element assemble and the inner wall of the communicating hollows in the insulation case (1). The contact element assemble is connected under the floating condition (free rolling and turning) in the insulation case.

The contact elements (20) can be turned around the center line in the specific range and they can be also inclined from the center line of the side surfaces of the contact elements (20) (20). The core wires of the lead wire (30) are thin whereby the lead wire can be flexibly deformed depending upon the movement of the contact elements (20). Accordingly, even though the position of the blades (80) to the connector is varied to any direction, the connecting parts can maintain suitable contacting condition in full parts.

In the embodiment, the lead wire on which the compressed terminal is clamped, is used. Thus, it is possible to use solderless terminals or to use flexible strand. In the latter case, it is unnecessary to use the washer (70).

In accordance with the structure of the present invention, the plug-in type connector can maintain suitable contacting condition with the bus bar for full contacting parts even though the relative positions of the bus bars, the plug-in type connector and the control unit are varied in any directions. Accordingly, the current capacity can be remarkably high and the fusion resistance can be remarkably high. Even though the bus bar (5) is vibrated by the short-circuit current, the contacting part can be shifted depending upon the vibration whereby the plug-in type connector having high reliability can be attained. When the error of the relative positions of the bus bar to the plug-in type connector is over the maximum limit, the bus bar can not be inserted whereby the failure of the relative position can be found to prevent an accident.

What is claimed is:

1. A plug-in type connector comprising:
   an insulating case having a hollow chamber for containing a contact element, said chamber having a base, walls extending from the base, and an open top surface;
   a U-shape contact element having inwardly inclined legs located within said chamber in a floating condition, said U-shape contact element comprising a base located adjacent said base of said chamber and said legs extending from the base of said element and having ends located adjacent and below said open top surface of said chamber, said contact element being smaller than said chamber so as to be movable within said chamber due to the resulting space between said U-shape element and said walls of said chamber; and
   at least one elongated project formed on an inner wall of said chamber, said project having one end facing the base of the chamber with a gap which is slightly greater than the thickness of said base of said U-shape contact element and an other end positioned between said inwardly inclined legs of the U-shape contact element;
   whereby the contacting of one of said legs by said at least one elongated project limits the movement of said leg; and
   wherein when a bus bar is not inserted in said contact element, there are small clearances between said other end of said project and each of said U-shape contact legs whereas when said bus bar is inserted, relatively large clearances are produced therebetween.

2. A plug-in type connector according to claim 1 wherein at least two opposite side walls of said side walls of said chamber include V-shape concave portions extending from said top surface towards said base in such a manner that a straight line extending from the base of one V-shape concave portion to the base of another must pass between said legs.

3. A plug-in type connector according to claim 1, wherein spaces are formed between the walls of said hollow chamber of said insulation case and said U-shape contact element in transversal and vertical directions and said U-shape contact element is connected in a floating condition so as to be inclinable and turnable in specific ranges.

4. A plug-in type connector according to claim 1 including a lead wire connected to a pair of contacting legs at said base of said U-shape contact element.

5. A plug-in type connector according to claim 1 wherein the end of the project facing the base side of the chamber is formed circularly.

6. A plug-in type connector according to claim 2 wherein the ends of the legs of the U-shape contact element comprise bent portions bent outwardly and spread sufficiently far to cross the linear portion of the V-shape concave.

7. A plug-in type connector according to claim 2 wherein the opening of the V-shape concave is formed to prevent the fitting of the bus bar to the U-shape contact element when the position of the bus bar is shifted from the V-shape concave.

8. A plug-in type connector according to claim 4, further comprising:
   a communicating hollow for receiving lead wire inside the insulation case through the communicating hollow, said hollow formed in the base of the case with the position of the communicating hollow eccentric to the position fixing the lead wire on the base of the U-shape contact element.

9. A plug-in type connector according to claim 4 wherein the lead wire is received in the case through the communicating hollow formed in the base of the insulation case and the opening of the communicating hollow facing the contact in the chamber is enlarged to permit the relatively free movement of the lead wire.

* * * * *